June 22, 1965  W. H. GUIER  3,191,176

METHOD OF NAVIGATION

Filed Sept. 18, 1962  4 Sheets-Sheet 1

William H. Guier
INVENTOR

BY *Claude Funkhouser*

ATTORNEY

W. H. Guier
INVENTOR

BY Claude Funkhouser
ATTORNEY

June 22, 1965 W. H. GUIER 3,191,176
METHOD OF NAVIGATION
Filed Sept. 18, 1962 4 Sheets-Sheet 3

William H. Guier
INVENTOR

BY Claude Funkhouser
ATTORNEY

United States Patent Office 3,191,176
Patented June 22, 1965

3,191,176
METHOD OF NAVIGATION
William H. Guier, Silver Spring, Md., assignor to the United States of America as represented by the Secretary of the Navy
Filed Sept. 18, 1962, Ser. No. 224,580
4 Claims. (Cl. 343—112)

The present invention relates to navigation system and, more particularly, it relates to a method and system of navigation utilizing an artificially established earth satellite as a reference for determining the location of an observer in terms of latitude and longitude.

For many centuries man has navigated ships out of sight of land. Primarily, his methods of navigation have used the known motions of stars, sun and moon relative to himself, together with some method for keeping time. The sophistication and accuracy of such celestial navigation procedures have grown steadily until today, navigation, during ideal conditions, is usually quite accurate. However, the ability to obtain celestial navigation fixes in all conditions of weather leaves much to be desired. In relatively recent times various systems of radio navigation have been developed to provide all weather navigation capability. These radio techniques provide the navigator the capability of measuring either distances or angles, or both, between himself and various well-known positions on land. Thus, in essence, such radio navigation aids are methods for extending land masses to the navigator, so that he need not navigate "out of sight of land." These radio navigation aids have also been developed to such an extent that for normal navigation requirements, accuracy of the navigation fix is adequate so long as the navigator is within the usable range of the base stations. Characteristically, these navigation aids decrease in accuracy with distance from the base stations and, at the current stage of development, such navigation aids are not truly world-wide.

With the advent of artifical earth satellites, it is possible to devise an all-weather navigation system having truly global coverage. One such system of navigation is described by Frank T. McClure in his U.S. patent application, "Method of Navigation," Serial No. 736,435, filed May 12, 1958, now abandoned. That system of navigation is sophisticated in operation and requires extensive and very complicated equipment to provide the navigator's position in latitude and longitude.

One object of the present invention, therefore, resides in the provision of a simplified navigation system allowing the navigator to compute his position without the use of a large computer.

Another object of the present invention is to provide a method for determining the geographic coordinates of an unknown location by utilizing the change in range between the unknown location and a transmitting satellite.

Another object of the invention is to provide a method of navigation having accuracies which exceed those presently available.

A further object of the invention is to provide a method of navigation having world-wide capabilities and unlimited traffic handling capacity.

Another object of the invention is to provide a method of navigation that is relatively immune to interferences.

A further object of the invention is to provide a method of navigation and that is compatible with navigating equipment of varying complexity and cost, to satisfy both high and low accuracy requirements.

Other objects and many of the attendant advantages of the present invention will be readily appreciated as the same becomes better understood by reference to the following detailed description when considered in connection with the accompanying drawings, wherein.

Figure 1:
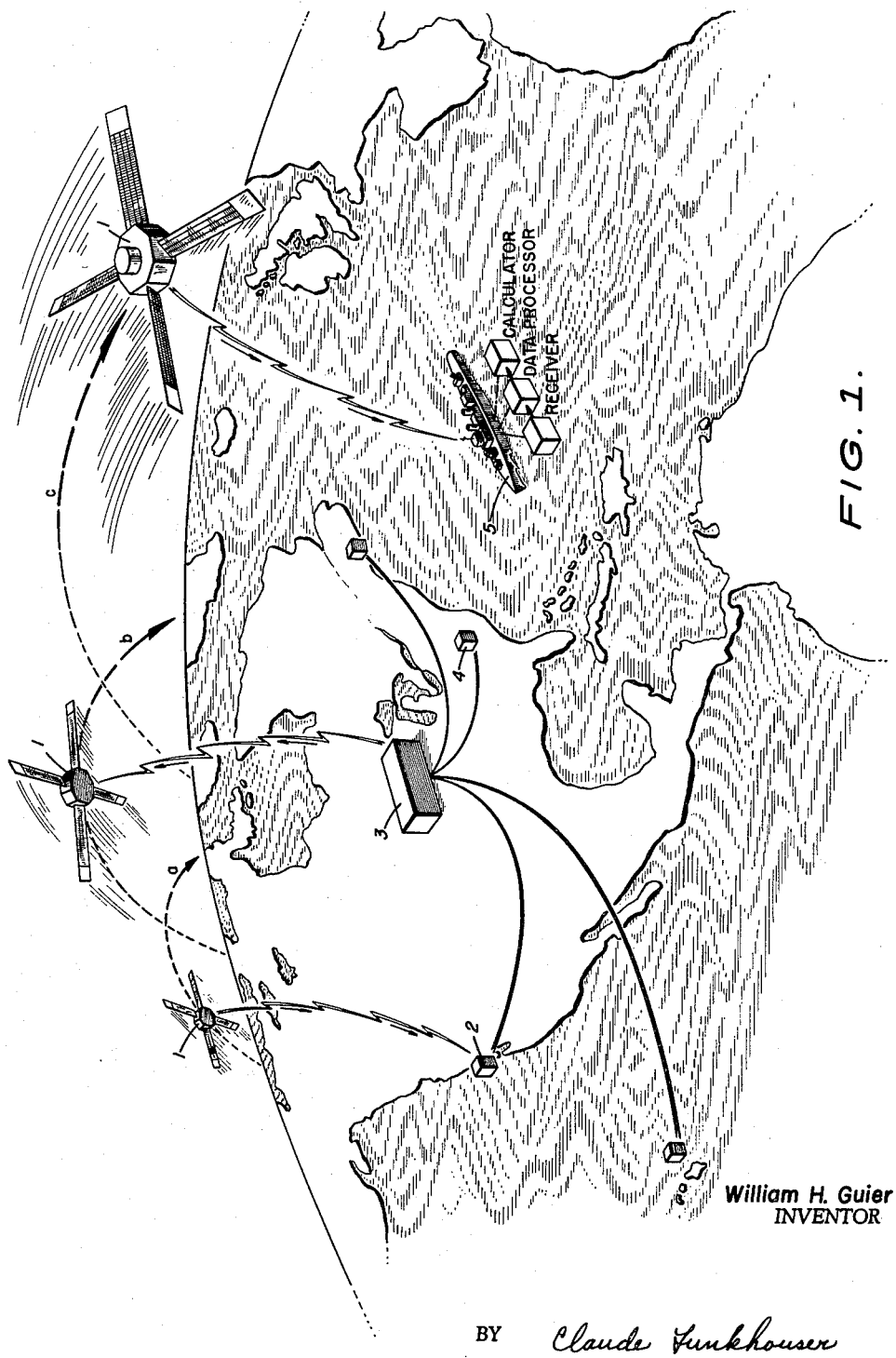
FIG. 1 is a schematic representation of a navigation system according to the instant invention.

This invention requires a plurality of orbiting satellites at an altitude of approximately 600 nautical miles. The parameters of the orbits do not need to be controlled with accuracy beyond that of present practice. Each satellite contains a stable oscillator for controlling the frequency of a transmitter radiating a few watts of power. With a single frequency, refraction of continuous wave signals, when traversing the ionosphere, limits the accuracy of the system and introduces an error that is typically a mile. By transmitting a second frequency, controlled by the same oscillator, so that the signals are vigorously coherent, it is possible to make a correction for refraction, and thus to reduce the refraction error to such a low level that it can be disregarded. The higher frequency may be in the range of several hundred megacycles, and the lower frequency may be some simple fraction of the higher frequency.

Clearly, the navigator must know the position of the satellite during the passage. At present, it is not possible to predict the position of a satellite with an accuracy of a mile for more than three or four days. The position of the satellite will be transmitted from the satellite itself, and will consist of its altitude, longitude and latitude in terms of its orbital parameters. Thus, each satellite will contain a magnetic memory which will be filled with an ephemeris table by transmission from a ground injection station. The table will contain the three coordinates of the satellite, taken with respect to an inertial geocentric system, for every other minute over a time period of twelve hours, plus perhaps two additional hours to allow some needed flexibility in the passages over the injection station from which the memory is filled. In addition to the coordinates, the table will contain the time to which each set of coordinate values applies.

Each two minutes the satellite will transmit a burst of information from its memory. It will not transmit the entire contents of its memory, because the observer has no need for the ephemeris except at the times when he is actually hearing the satellite. Instead, the satellite will transmit the line of the table that applies at the exact two-minute epoch when the transmission began, plus the preceding three lines and the following four lines. During a passage, the observer will receive the lines of the table that he needs, at least four times, and should be able to eliminate transmission noise with a high confidence level.

The need for transmitting the bursts of information periodically gives rise to a valuable dividend. The satellite needs a clock aboard to time the transmissions. Since it already contains a stable oscillator, the only other item needed for a clock is a counter for counting the cycles of the oscillator. Since the oscillator must be accurate in order that the Doppler shift may be accurately measured, the resulting clock is necessarily accurate also. Hence, the leading edges of the transmission bursts constitute accurate time signals, and the observer does not need an independent chronometer.

The ground stations to be used with the instant invention will measure the Doppler frequency on both satellite transmissions, and automatically make the correction for ionospheric refraction. Additionally, the ground stations must also monitor the time pulses from the satellite, and compare them with standard time epochs as determined by the U.S. Naval Observatory.

The Doppler data, corrected for refraction, and the small errors in time signals are transmitted by teletype from the tracking stations to a computing center. Here, the Doppler data is used to determine the satellite orbit, then the position of the satellite is computed ahead for the necessary time span, and the numbers needed for storage in the satellite memory are computed. In addition, the timing errors are analyzed to give the clock rate, and the corrections both to the clock setting and the clock rate are determined. The next time the satellite is within range of the injection station, the satellite memory is erased, the new information is inserted into the memory, and the clock is reset and regulated. The satellite immediately repeats back all the information, that was just inserted, to the ground station. A comparison is made and any errors that are detected can be corrected. When the accurate storage in the memory has been verified, the memory is locked by a time clock in the satellite, controlled by its own internal clock, and the memory is locked out from additional receipt of information until approximately twelve hours later, when the satellite will again be within the range of the ground injection station.

The state of motion of the observer is also a matter of considerable importance. The simplest case is that of an observer at rest relative to the earth. If the observer is moving, he must calculate his position during the ten or fifteen minutes of a satellite passage, with respect to his position at the start of the passage, by dead reckoning. He is under no obligation to maintain a steady course during the passage, although a steady course may make it easier to do the dead reckoning needed. Any error made in this dead reckoning will of course introduce an error into the fix. This error is inherent in any system of navigation in which fixes are intermittent, and is not properly attributable to the instant method of navigation.

The observer may be equipped with a receiver capable of using only a single frequency, and thus limit his accuracy to about a mile, or his receiver may be equipped to receive two frequencies with their attendant higher degree of accuracy. For the single frequency receiver, the observer must have a stable oscillator. Any bias in measuring frequency that is maintained over a passage produces a proportional error in position, with the ratio 1 part in $10^8$ in frequency producing an error of one mile in position.

With the present state of the art, it is very expensive to make an oscillator that holds its frequency to 1 part in $10^8$ over a period of several days. To the required accuracy, then, the observer must assume that he does not know the frequency of his oscillator. This means that the measurements and computations needed for a fix must be arranged so as to eliminate the value of his local frequency. When this is done properly, the only stability needed is a few parts in $10^9$ over a fifteen-minute period. Such stability is not hard to attain. A carefully chosen crystal in a Dewar flask turns out to be entirely adequate.

The observer will then measure the Doppler frequency by beating the signal received from the satellite with a signal from his local oscillator, and counting cycles of the beat note, which is in the tens of kilocycles range. One complication arises here. The Doppler frequency shift changes from plus to minus at the center of a passage. The beat note does not distinguish the sign of the frequency difference; hence, in order to interpret the measurements unambiguously, it must be arranged that the beat frequency never passes through zero. For this reason, the local oscillator is offset from the satellite oscillator by 80 parts in each million. This offset exceeds the maximum Doppler shift, so that the beat note never changes in sign.

A major source of error in such a satellite Doppler navigation system is ionospheric refraction. For purposes of studying its effect upon the Doppler shift, the ionosphere can be replaced by an equivalent index of refraction. Since the Doppler shift of a signal emanating from a satellite is basically the time rate of change of its electromagnetic path length, it is altered from what it would be in the absence of the ionosphere.

The navigational error produced by ionospheric refraction can be understood quantitatively by noting that the maximum slope of the Doppler curve is a rough measure of the slant range, and that refraction has a direct effect on this slope. Since the effect of refraction is to decrease the slope, the refraction error will be such as to place the observer further from his actual location, as measured from the satellite, than would be true if the ionosphere had no effect upon the transmitted signals. For example, it has been found that for a ground range of 500 nautical miles and a transmitter frequency of 200 megacycles per second, the navigational error is approximately two nautical miles. Furthermore, the best attainable fit of the refracted Doppler curve by an unrefracted theoretical Doppler curve is about two cycles per second R.M.S., as opposed to a fit of about 0.2 cycle per second R.M.S. when the refraction contribution was not included. Studies on the effects of refraction indicate that the refraction contribution cannot be ignored for transmitter frequencies up to about 500 megacycles per second. Furthermore, the degree to which the electron distribution in the ionosphere can be predicted, to permit a previous correction for refraction, indicates that such predictions are not sufficiently reliable to reduce the refraction-created errors dependably below one-half mile. Since it is not advisable to use transmitter frequencies greater than about 500 megacycles per second for a navigational system, the refraction error must be eliminated from the received signal. The error frequency added to the transmitted frequency attributable to the refractive effect of the ionosphere decreases linearly from 50 megacycles to 500 megacycles. This linear relationship allows the elimination of the error frequency term by the use of two frequencies. The two related frequencies can be combined in such a way as to perform the solution of two simultaneous equations containing two unknowns. Various methods are available and the actual choice utilized in the instant invention is not to be considered as eliminating the others from the scope of this invention.

Referring to FIG. 1, there can be seen a schematic representation of an operational navigation system based on the instant invention. A satellite 1 is shown in three different orbits $a$, $b$, and $c$, representing the three different phases of operation of this navigational system. When the satellite is in orbit $a$, a tracking station 2 receives Doppler signals from the satellite. There can be any number of Doppler transmitters aboard the satellite, but the reception of only one is sufficient to determine the exact orbital parameters of the satellite by the least squares method of computation. The tracking station makes corrections for the refractive effect of the ionosphere and sends the corrected Doppler data to a computing center 3 which performs the computations involved in ascertaining the exact orbital parameters of the satellite for the next 14 hour period. The computing center utilizes the continuous reception of the changing Doppler frequency, from the orbiting satellite, to make its calculations.

Additionally, the tracking station 2 receives timing signals from the orbiting satellite and sends them to the computing center 3 where computations are also made to determine if any error in timing exists and to compute the amount of any modification which must be made to the timing signal to bring it back to its proper relationship with standard timing signals received from the Naval Observatory 4.

When the various computations have been made at the computing center 3, the center then transmits the new orbital parameters to the satellite 1 in orbit *b*, along with time correction signals to adjust the satellite clock.

Upon reaching its position in orbit *c*, the satellite performs its next function of enabling an observer, located aboard a ship 5, to accurately determine his own position from the information transmitted to him from the satellite. Preferably, the satellite could transmit directly its exact altitude, longitude and latitude every two minutes, but the memory requirements would be too large. However, the satellite can transmit sufficient orbital parameters from which the observer can compute by hand and with the aid of a desk calculator, or by a special purpose computer, the Cartesian coordinates of the satellite at the time of each transmission.

The orbital parameters of the satellite can be sent independently of the Doppler data by a separate radio transmitter or it can be sent by the same radio transmitter in the satellite by phase modulating a continuous wave signal with the orbital information. The phase modulation can be separated from the received signal and decoded, giving the orbital parameters of the satellite, without interfering with the counting of the Doppler frequency associated with the continuous wave transmission from the satellite.

Figure 2:
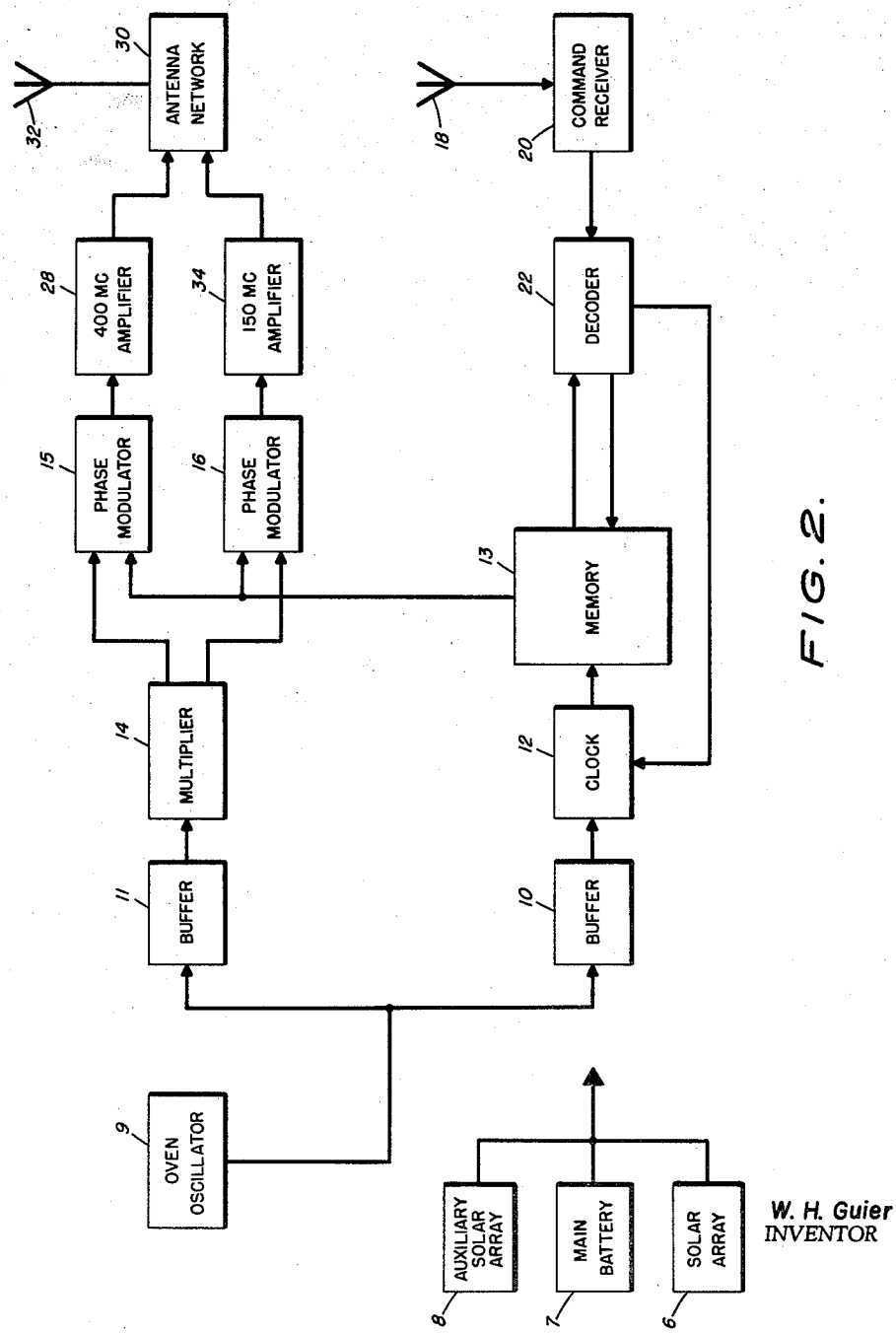
FIG. 2 is a block diagram of the electrical arrangement of one of the satellites used in the instant invention.

Referring to FIG. 2, there can be seen a generalized block diagram of the satellite that is utilized in this invention. A solar array 6 is the primary source of electrical energy for the satellite. This array is assisted in providing sufficient charging current to a main battery 7 by an auxiliary solar array 8. This auxiliary array will only be utilized during periods of peak power requirements. The main battery 7 provides power to all the electronic circuits in the satellite.

A temperature controlled oscillator 9 is the source of all timing signals throughout the satellite. The oscillator 9 applies its output to two buffer stages 10 and 11 which prevent the oscillator from being loaded down by the succeeding electronic circuits. The output of the buffer circuit 10 is applied to a clock 12 which controls the operation of a memory 13.

The output of the buffer circuit 11 is applied to a frequency multiplier circuit 14 which supplies the transmission frequencies to a pair of phase modulators 15 and 16.

An antenna 18 receives from an earth-bound injection station, the orbital information superimposed upon a carrier frequency, and applies it to a command receiver 20. The receiver 20 separates the satellite's orbital information and applies it to a decoder 22 which changes it to binary form for application to the memory 13. Sufficient positional information, covering the next 14 hours of the satellite's expected orbit, is injected into the memory. Additionally, timing corrections are made to the clock 12.

During a transmission from the satellite, the memory 13 applies the appropriate positional information to a pair of phase modulators 15 and 16. The positional information modulates the stable frequency applied to the modulator from the multiplier 14. The output of the phase modulator 15 is applied to an amplifier 28 which increases the signal level to a few watts. The output of this amplifier is applied to an antenna network 30 which passes it to an antenna 32 for radiation to observers on the earth. The output of the phase modulator 16 is applied to an amplifier 34 which also increases the signal level of the 150 megacycle signal to a few watts. The output of 150 megacycle amplifier 34 is applied to the antenna network 30 which applies it to the antenna 32 for radiation to the observers on the earth.

Figure 3:
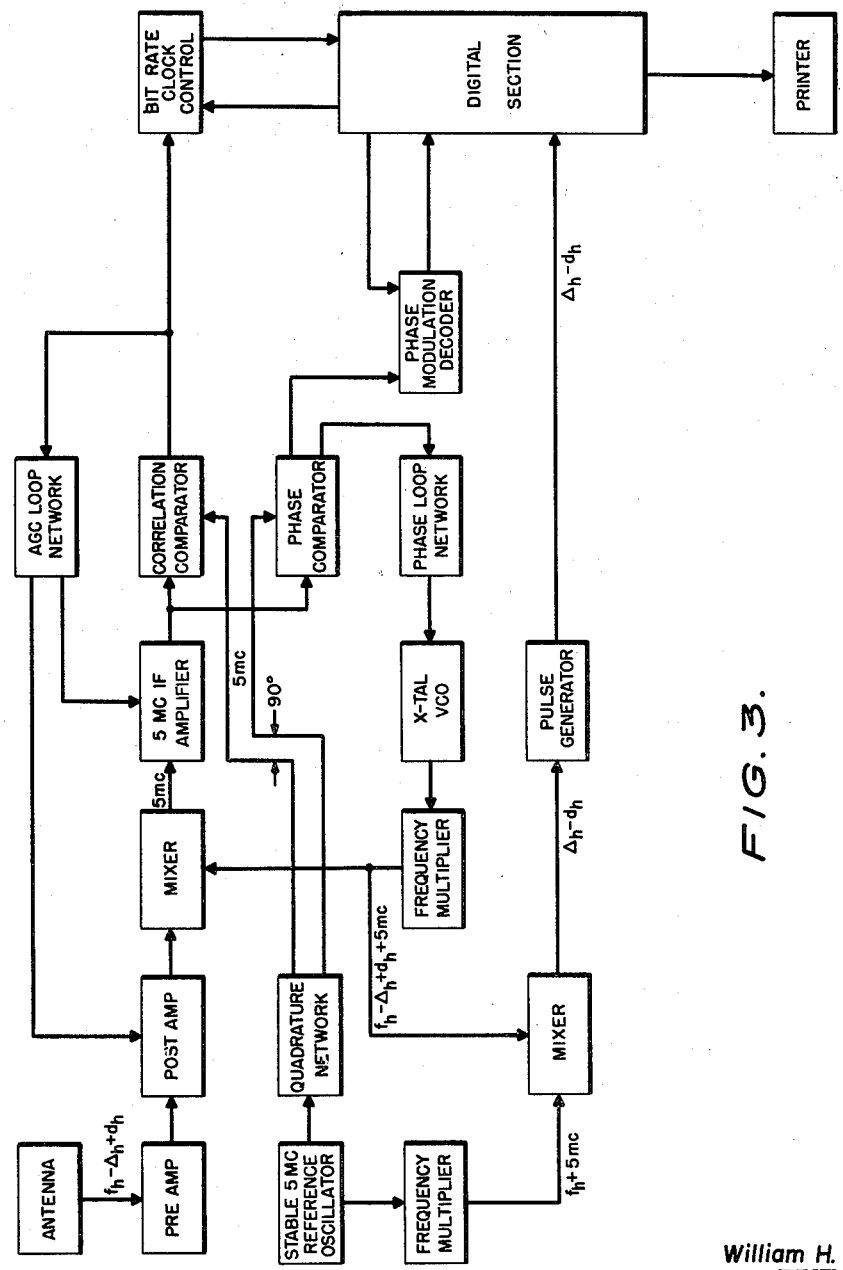
FIG. 3 is a block diagram of a radio receiver used to decode orbital parameters of the satellite.

Referring to FIG. 3, there can be seen a block diagram of a simplified navigation receiver that may be used in this invention. The receiver, as shown in FIG. 3, is adapted to receive a single frequency, and features a phase-locked loop which keeps the receiver locked onto the signal from the satellite, and allows the receiver to receive within a bandwidth of only a few cycles, in spite of the tens of kilocycles swing in frequency during a passage. The received signal is then mixed with a signal from the local oscillator, and the beat frequency note is filtered out and sent to a counter located in the digital section. The positional information is decoded by the receiver and sent to the digital section for printing by an associated printer.

Figure 4:
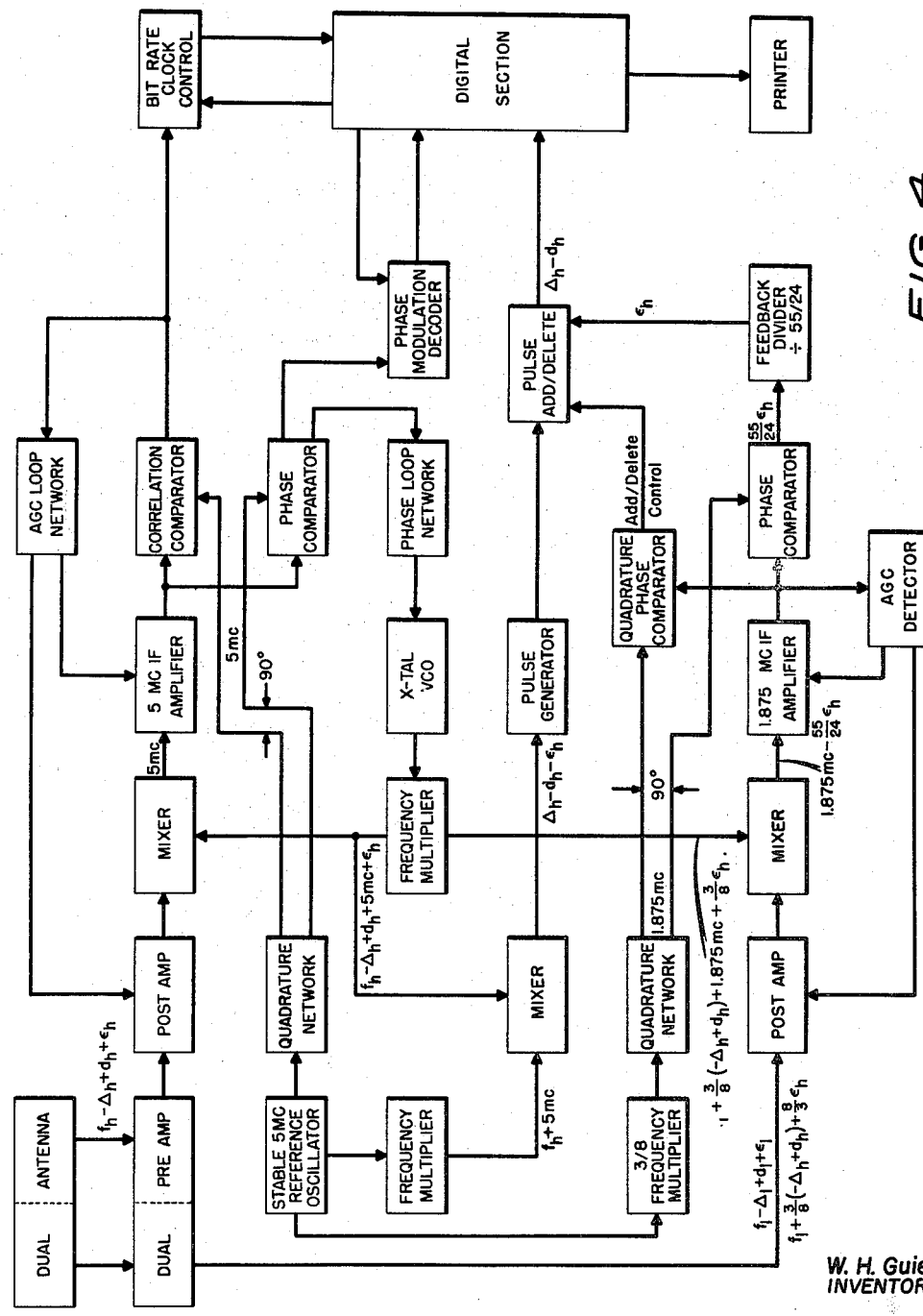
FIG. 4 is a block diagram of a receiver used to correct the received Doppler transmission for the error introduced by the refractive effect of the ionosphere.

Referring to FIG. 4, there can be seen a block diagram of a receiver adapted to receive two frequencies. It has been stated earlier that refraction, when using a single frequency, introduces an error in position, of the order of a mile. More specifically, this is the error when using a frequency of several hundred megacycles during the ionspheric peak of a typical day. Usually the refraction error is less than this, but occasionally it may be more. Fortunately, the refractivity in the ionosphere varies inversely with the square of the frequency, to first order to accuracy, and this fact can be used to make a first order correction for refraction.

To convert single-frequency navigating equipment to dual frequency, a second receiver is required. Because the two-received frequencies are always in constant ratio with a few parts in $10^8$, the order of the refraction effect, only one receiver need be phase-locked; the other can be slaved to this one.

The output of the second receiver can be combined with the first to eliminate refraction. One means of eliminating the refraction error requires mixing in digital circuitry as shown by Guier et al., in their U.S. patent application entitled, "Ionospheric Refraction Correction Sytem," Serial No. 207,828, filed July 5, 1962, now Patent No. 3,124,799, and assigned to the United States Government as represented by the Secretary of the Navy. Alternatively, the two radio frequencies can be multiplied by the appropriate integers, and mixed directly as shown in the circuit illustrated at FIG. 4. The output of the mixer is modified by the error term and then sent to the counter for counting.

Counting is initiated by the first time pulse received from the satellite. The counter continues counting until the next time pulse is received; at this time, the output of the counter is read out while the counter continues counting. At the next time pulse, the counter is again read out and so on. If the receiver should lose lock to the incoming signal, the counter is stopped, and resumed the next time a time pulse is successfully received.

When the counter is read out, its reading is automatically printed on any simple numerical printer. During the two minutes between time pulses, the receiver is also demodulating the orbital information being transmitted by the satellite. As fast as it is demodulated, this information is also printed on the printer. At the end of a two-minute interval, then, the printer paper shows all of the orbital information transmitted during that interval, followed by the total cycle count of the beat note obtained up to the end of the interval. The orbital information printed out contains a portion from the fixed memory, which gives the parameters of the satellite to specify the best elliptical approximation to the actual orbit, and a portion from the ephemeral memory, which changes every two minutes, and contains the small corrections to the elliptical approximation. Together, these quantities specify the real non-elliptical orbit of the satellite.

From the data obtained during the passage, it is necessary to determine three quantities, namely the latitude and longitude of the navigator, plus the unknown frequency of the local oscillator relative to the satellite oscillator. Of course, the observer is not usually interested in the latter quantity, so the computations are usually arranged simply to eliminate this quantity, but it can always be obtained by additional computation if the observer wishes to know it for some reason. Whether he actually obtains this frequency or not, the mathematical situation is the same. There are three unknowns, and hence there must be four two-minute intervals for which data is obtained. It is not necessary that these intervals be consecutive, and it is highly desirable that they should not all be obtained when the satellite is on the same side of the point of closest approach.

After obtaining the data, the first task of the navigator is to compute the position of the satellite, in Cartesian coordinates, at the beginning and end of each two-minute interval to be used in the fix. It would be convenient if these coordinates were transmitted by the satellite. Unfortunately, a prodigious memory capacity would be required to do this. Instead, it is possible to take advantage of the fact that the orbit of a polar satellite is very nearly an ellipse lying in a plane fixed in inertial space. If the orbit were exactly an ellipse, only a few numbers would be required to permit calculating the coordinates of the satellite at any time; further, these numbers, for the ellipse that best fits the actual orbit, change slowly with time, and can be taken as constant over a twelve-hour period. The general technique, then, is to transmit the numbers for calculating coordinates on an elliptical orbit. The discrepancies between this orbit and the actual orbit are only a few miles, so the quantities in the ephemeris memory transmitted by the satellite are amounts to be added in order to obtain the true coordinates from those calculated for the ellipse.

The satellite memory, and the transmissions from the satellite, are thus divided into two parts. The first part, called the fixed part, containing too many decimal digits, the relatively few parameters needed to specify the best elliptical approximation to the actual orbit; these do not change within a twelve-hour period. The second part of the memory, called the ephemeral part, contains the small corrections, which change from point to point, but require few decimal digits. In this way, the memory can be kept to feasible size.

The fixed quantities are:

$t_p$—Time first perigee after $0^H$ or $12^H$ Universal time
$\omega_o$—Mean motion: $2\pi$/period
$\varphi_p^{(o)}$—Argument of perigee at $t_p$
$\omega_p$—Precession rate of perigee
$\epsilon$—Eccentricity
$A_o$—Mean semi-major axis
$\Lambda_N^{(o)}$—Right ascension ascending node at $t_p$
$\omega_N$—Precession rate of node $C_i$—$\sin\left(\frac{\pi}{2}-i\right)$; $i$—Inclination orbital plane $S_i$—$\cos\left(\frac{\pi}{2}-i\right)$ $\Delta M$—Chage of mean anomaly for 1 hour
$\delta M$—Change of mean anomaly for 2 minutes where the subscript $_p$ indicates values which are correct for time $t_p$ The ephemeral quantities are:

$t_k$—Time after integral half hour $\delta E_k$, $\delta A_k$
$\delta E_k$—Correction to true anomaly at $t_k$
$\delta A_k$—Correction to semi-major axis at $t_k$ The following equations are examples of the computations that are required for the "hand" navigator to reconstruct the Cartesian coordinates of the satellite $x$, $y$, and $z$ in an earth-fixed coordinate system. This coordinate system has the z-axis coincident with the spin axis of the earth and the x-axis in the plane of the Greenwich meridian. The y-axis is chosen to form a right-handed coordinate system. In this calculation, it is assumed that any spurious values for the variable quantities have been deleted by differencing methods and that four time points, $t_k$, have been chosen for which the Cartesian position coordinates are to be computed. Unless otherwise stated, the index, $k$, runs from one to four with $t_m$ being one of the middle time points.

$$\Delta t_m = t_m - t_p = 1 \cdot 60 + \delta t_m$$

where:

$t_m$=fiducial time within a satellite pass.
$1$=number of integral hours since $0^h$ Universal time, and
$\delta t_m$=number of minutes after integral hour.

$$\varphi_p = \varphi_p^{(o)} + \omega_p \Delta t_m$$
$$\Lambda_N = \Lambda_N^{(o)} + \omega_N \Delta t_m$$
$$C_p = \cos \varphi_p$$
$$S_p = \sin \varphi_p$$
$$M_m = \text{Mod}_{360°}[1 \cdot \Delta M + \omega_o \delta t_m]$$

where:

$M_m$=Mean anomaly at the fiducial time $t_m$.

$$M_k = M_m + (k-m) \delta M$$

where:

$(k-m)$=Number of even minutes between the $m$th point and the $k$th point.

$$\sigma_k = \epsilon \sin M_k$$
$$E_k = M_k + \sigma_k + \delta E_k$$
$$C_k = \cos E_k$$
$$S_k = \sin E_k$$
$$A_k = A_o + \delta A_k$$
$$\xi = A_k(C_k - \epsilon)$$
$$\zeta_k = A_k S_k$$
$$x_E^{(k)} = \xi_k C_p - \zeta_k S_p$$
$$y_E^{(k)} = \xi_k S_p - \zeta_k C_p$$
$$\eta_k = y_E^{(k)} C_{i(G)}$$
$$\lambda_k = \Lambda_N - \Lambda_k$$

where:

$\Lambda_k^{(G)}$=the right ascension of the Greenwich meridian for time $t_k$.

$$C_\lambda^{(k)} = \cos \lambda_k$$
$$S_\lambda^{(k)} = \sin \lambda_k$$
$$x_k = x_E^{(k)} \cdot C_\lambda^{(k)} - \eta_k S_\lambda^{(k)}$$
$$y_k = x_E^{(k)} \cdot S_\lambda^{(k)} + \eta_k C_\lambda^{(k)}$$
$$z_k = y_E^{(k)} S_i$$

$$\text{Long} = \tan^{-1} \frac{y_k}{x_k}$$

$$\text{Lat} = \sin^{-1} \frac{z_k}{r_k}$$

where:

$$r_k = \sqrt{x_k^2 + y_k^2 + z_k^2}$$
$$\Omega_k = \text{Long} \times (57.295780)$$
$$\lambda_k = \text{Lat} \times (57.295780)$$
$$h_k = r_k \times (3441.615)$$

Once the Cartesian coordinates $(\Omega_k \lambda_k h_k)$ of the satellite at the four data points have been ascertained, it is then possible for the observer to obtain his own latitude and longitude by means of the following computations.

$$\gamma_1 = \frac{-c}{f_t^{(1)}} \frac{P_1^{(1)} - \frac{1}{m} P_1^{(2)}}{1 - \frac{1}{m^2}}$$

where:

$c$=the velocity of light in nautical miles per second,
$f_t^{(1)}$=the higher frequency transmitted from the satellite,
$P^{(1)}$=the Doppler count at the beginning of a two minute interval for the higher frequency,
$P^{(2)}$=the Doppler count at the end of the same two minute interval for the higher frequency,
$l$=the designation of four different intervals 1, 2, 3, 4, and
$m$=the ratio of the two transmitted frequencies. If two frequencies are not received
$m$=infinity.

$$r_E(\lambda_o) \cong 3,436.0 + 5.8 \cos 2\lambda_o$$

where: $\lambda_o$=the estimated latitude of the observer.

$$\Delta r_1 \cong 10.6 \sin (\lambda_o+\lambda_1) \sin (\lambda_o-\lambda_1)$$

where $\lambda_1$=the Cartesian coordinate of the satellite for data point 1.

$$H_1 = h_1 + \Delta r_1$$

where $h_1$=the Cartesian coordinate of the satellite for data point 1.

$$\lambda_o{}^{(c)} = \arctan [(1-f)^2 \tan \lambda_o]$$

where:

$$f = \frac{1}{297}$$

$$\lambda_1{}^{(c)} = \arctan [(1-f)^2 \tan \lambda_1]$$

$$\frac{\partial \lambda_o{}^{(c)}}{\partial \lambda_o} = \frac{\sin 2\lambda_o{}^{(c)}}{\sin 2\lambda_o}$$

$$S_1 = 2\left[\frac{\sin^2 (\lambda_o{}^c - \lambda_1{}^{(c)})}{2} + \cos \lambda_o{}^{(c)} \cos \lambda_1{}^{(c)} \sin^2 \frac{(\Omega_o - \Omega_1)}{2}\right]$$

where:

$\Omega_o$=observer's estimated longitude at the time of the satellite pass, and
$\Omega_1$=Cartesian coordinate of the satellite for data point 1.

$$\frac{\partial S_1}{\partial \lambda_o{}^{(c)}} = \sin (\lambda_o{}^{(c)} - \lambda_1{}^{(c)}) - 2 \sin \lambda_o{}^c \cos \lambda_1{}^{(c)} \sin^2 \frac{(\Omega_o - \Omega_1)}{2}$$

$$\frac{\partial S_1}{\partial \Omega_o} = \cos \lambda_o{}^c \cos \lambda_1{}^{(c)} \sin (\Omega_o - \Omega_1)$$

$$R_1{}^{(o)} = \sqrt{H_1{}^2 + 2 r_1 r_g S_1}$$

$$D_1{}^{(1)} = \frac{r_1 r_g}{R_1{}^{(0)}} \frac{\partial S_1}{\partial \lambda_o{}^{(c)}} \frac{\partial \lambda_o{}^{(c)}}{\partial \lambda_o}$$

$$D_1{}^{(2)} = \frac{r_1 r_g}{R_1{}^{(0)}} \frac{\partial S_1}{\partial \Omega_o}$$

$$\sigma_1 = (\gamma_{1+1} - R^o{}_{1+1}) - 2(\gamma_1 - R_1{}^o) + (\gamma_{1-1} - R_{1-1})$$

$$\alpha_1 = D^{(1)}{}_{1+1} - 2D_1{}^{(1)} + D^{(1)}{}_{1-1}$$

$$\beta_1 = D^{(2)}{}_{1+1} - 2D_1{}^{(2)} + D^{(2)}{}_{1-1}$$

$$d = \alpha_2 \beta_3 - \alpha_3 \beta_2$$

$$\delta\lambda = \frac{\beta_3 \sigma_2 - \beta_2 \sigma_3}{d}$$

$$\delta\Omega = \frac{\alpha_2 \sigma_3 - \alpha_3 \sigma_2}{d}$$

and the navigator's position is then

Latitude = $\lambda_o + \delta\lambda$
Longitude = $\Omega_o + \delta\Omega$

The Doppler frequency has been referred to several times as if it were what the observer would measure, whereas it has been said that the observer counts cycles of a certain beat note over an extended time interval. This apparent paradox will be eliminated by the following discussion:

The frequency of the beat note that is counted is the sum of the Doppler frequency and the unknown difference between the transmitted and local frequencies. If $f_b$ is the beat frequency, then $$f_b = -(f/c)\dot{p} + \delta$$

where:

$\delta$=the unknown but constant difference,
$f$=the frequency of the satellite's transmitter,
$c$=the speed of light, and
$\dot{p}$=the slant range between the satellite and the observer.

Counting the cycles of the beat frequency is the same as integrating it with respect to time. Then, $$N_b = \int_{t_1}^{t_2} f_b dt = -(f/c) \int_{t_1}^{t_2} \dot{p} dt + (t_2 - t_1)\delta$$

where:

$N_b$=the total Doppler frequency count obtained between times $t_1$ and $t_2$.

But when the frequency count is extended over a two minute period the above equation for the total Doppler frequency count reduces to the following:

$$N_b = (f/c)(p_1 - p_2) + \Delta$$

where:

$P_1$=the range from the satellite to the observer at time $t_1$,
$P_2$=the range from the satellite to the observer at time $t_2$, and $$\Delta = (t_2 - t_1)\delta$$

The observer has four values of $N_b$, applying to three time intervals, and must calculate his position from these.

Thus, while the navigator makes use of the Doppler shift in locating himself, he finds it convenient to use, not values of the Doppler shift as specific times, but rather the integral of the Doppler shift. Integrating accomplishes two useful functions at the same time. It smoothes the noise, and allows one to use range differences instead of range rate in the computations, thus simplifying them.

Assuming for a moment that the unknown constant frequency $\delta$, and hence the product of this frequency over a specified time period $(t_2 - t_1)$ were known, and consider a given time interval for which the total Doppler frequency count ($N_b$) has been measured. From the data, the observer can calculate $P_1 - P_2$, the difference in range from two known points in inertial space to two different positions of himself in inertial space. The observer then calculates the coordinates of the known points, the satellite coordinates, with respect to the rotating earth, a calculation familiar to anyone who has used celestial navigation. Then the observer alters the coordinates of the second point by the amount of his motion, estimated by dead reckoning, during the two minutes from $t_1$ to $t_2$. The observer then knows the coordinates of two points in a coordinate system in which he is at rest, and he knows the difference $P_1 - P_2$ between his distances from these two points. The locus of all points which have a known difference in distance to two given points is a hyperboloid of revolution, whose foci are the given points. Thus, the navigator has located himself on a known hyperboloid by integrating the Doppler frequency over one time interval. From two intervals, the observer is located simultaneously on two hyperboloids with different foci. Since he also knows that he is on the surface of the earth, he is located completely.

With the offset frequency, $\delta$, unknown, the foci of the hyperboloids are still known, but the range difference is unknown. The observer must use three intervals, that is, three hyperboloids, instead of two, and must adjust $\delta$, until all three hyperboloids intersect at the same point on the earth's surface.

Since the surfaces involved are quadratic, there will usually be more than one point of intersection, whether $\delta$ be known or not. Unless the satellite passes almost overhead, the points of intersection are hundreds of miles apart, and the observer should have no trouble deciding which point applies to himself. If the satellite passes almost overhead, the latitude can be obtained unambiguously, but not the longitude.

With satellite orbits having altitudes of more than 500 nautical miles, the foci of the hyperboloids are so far from the navigator that the hyperboloids can be replaced by their asymptotic cones. Also, if the observer knows approximately where he is, he needs to use only short segments of the various curves of intersection, and can replace them by straight lines. That is, he can linearize the problem. The error introduced by linearization is about 0.1 mile or less provided that the error, in initial estimate of position, is 50 miles or less.

Obviously, many modifications and variations of the present invention are possible in the light of the above

What is claimed is:

1. In the art of navigation, the method of determining the geographic coordinates of an unknown location, comprising the steps of establishing in orbit a satellite having a continuous wave pulse transmitter, a receiver, and a memory system aboard, receiving transmissions from said satellite transmitter at a known location and determining orbital parameters of said satellite therefrom, transmitting said orbital parameters to said satellite receiver, storing said orbital parameters in said memory system for subsequent retransmission, receiving at an unknown location the continuous wave transmissions and the orbital parameters from said satellite, counting over predetermined time intervals the number of pulses received from said transmitter to determine the differences in slant range over said time intervals, and calculating the latitude and longitude of the unknown location from said orbital parameters, the differences in the slant range, and the time of measurement of said differences.

2. A system of navigation for determining the geographic coordinates of an unknown location, comprising a satellite traveling in a known orbit, a continuous wave pulse transmitter aboard said satellite, means at a known location for transmitting the orbital parameters of said satellite, means at an unknown location for receiving both the transmissions from said satellite and the orbital parameters of said satellite, means for counting the number of pulses received during predetermined time intervals, thereby determining the changes in slant range during said time intervals, and computing means for determining the geographic coordinates of said unknown location from said changes in slant range, the time of reception of said pulses, and said orbital parameters.

3. The system of claim 2, further including a computer at a known location, said computer being programmed to determine the orbital parameters of said satellite, means for applying the transmissions from said satellite transmitter and the time of reception of said transmissions to said computer, and means for transmitting said computed orbital parameters to said satellite for subsequent retransmission during said predetermined time intervals.

4. The system of claim 3, further including a phase modululating circuit for modulating said continuous wave transmissions from said satellite with intelligence indicative of said orbital parameters.

References Cited by the Examiner

UNITED STATES PATENTS 3,126,545   3/64   Smith.

FOREIGN PATENTS 1,260,471   3/61   France.

OTHER REFERENCES

Proceedings of the I.R.E., vol. 48, No. 4, April 1960, pages 507–516.

CHESTER L. JUSTUS, *Primary Examiner*.